(12) United States Patent
Morrison et al.

(10) Patent No.: US 7,779,898 B2
(45) Date of Patent: Aug. 24, 2010

(54) HEAT TRANSFER TUBE ASSEMBLY WITH SERPENTINE CIRCUITS

(75) Inventors: Frank T. Morrison, Crownsville, MD (US); Thomas P. Carter, Olney, MD (US)

(73) Assignee: Baltimore Aircoil Company, Inc., Jessup, MD (US)

( * ) Notice: Subject to any disclaimer, the term of this patent is extended or adjusted under 35 U.S.C. 154(b) by 407 days.

(21) Appl. No.: 11/404,003

(22) Filed: Apr. 14, 2006

(65) Prior Publication Data
US 2007/0240445 A1 Oct. 18, 2007

(51) Int. Cl.
F28D 1/00 (2006.01)
F28D 7/02 (2006.01)
F28D 7/06 (2006.01)
F28F 1/10 (2006.01)
F28F 9/02 (2006.01)
F28F 1/00 (2006.01)

(52) U.S. Cl. .................. 165/150; 165/163; 165/177; 165/172; 165/173; 165/176; 62/285

(58) Field of Classification Search .............. 62/285, 62/515–528; 165/172–184, 150, 163
See application file for complete search history.

(56) References Cited

U.S. PATENT DOCUMENTS

| | | | | |
|---|---|---|---|---|
| 1,788,068 A | * | 1/1931 | Scott ........................ | 165/149 |
| 2,007,309 A | * | 7/1935 | Sengstaken ................ | 165/162 |
| 2,054,404 A | * | 9/1936 | Askin ......................... | 62/404 |
| 2,792,201 A | * | 5/1957 | Whistler, Jr. ............... | 165/149 |
| 3,346,043 A | * | 10/1967 | Thurnauer ................. | 165/162 |
| 3,780,799 A | * | 12/1973 | Pasternak .................. | 165/150 |
| 4,196,157 A | * | 4/1980 | Schinner ..................... | 261/155 |
| 4,344,482 A | * | 8/1982 | Dietzsch .................... | 165/172 |
| 4,446,915 A | * | 5/1984 | Welch et al. ............... | 165/144 |
| 4,483,392 A | * | 11/1984 | Korsmo et al. ............. | 165/150 |
| 4,520,867 A | * | 6/1985 | Sacca et al. ................ | 165/144 |
| 4,549,605 A | * | 10/1985 | Sacca et al. ................ | 165/150 |
| 4,901,791 A | * | 2/1990 | Kadle ......................... | 165/150 |
| 5,219,023 A | * | 6/1993 | Kadle ......................... | 165/110 |
| 5,435,155 A | * | 7/1995 | Paradis ....................... | 62/515 |
| 5,507,340 A | * | 4/1996 | Alston ........................ | 165/150 |
| 5,540,276 A | * | 7/1996 | Adams et al. .............. | 165/151 |
| 5,699,675 A | * | 12/1997 | Nagai et al. ................. | 62/149 |
| 5,725,047 A | * | 3/1998 | Lopez ......................... | 165/149 |
| 6,382,310 B1 | * | 5/2002 | Smith ......................... | 165/121 |
| 6,804,976 B1 | * | 10/2004 | Dain ........................... | 62/525 |
| 6,820,685 B1 | * | 11/2004 | Carter et al. ................ | 165/150 |

* cited by examiner

*Primary Examiner*—Cheryl J Tyler
*Assistant Examiner*—Filip Zec
(74) *Attorney, Agent, or Firm*—Edward J. Brosius

(57) ABSTRACT

A method and apparatus are provided for cooling fluids entering a closed circuit cooling tower. A triple circuit assembly is used to cool the fluid in the closed loop. The triple circuit assembly design allows a heat transfer tube bundle to maintain a relatively low pressure drop, but without simultaneously lowering thermal performance to a significant degree as compared to traditional double serpentine or QUAD serpentine designs.

2 Claims, 3 Drawing Sheets

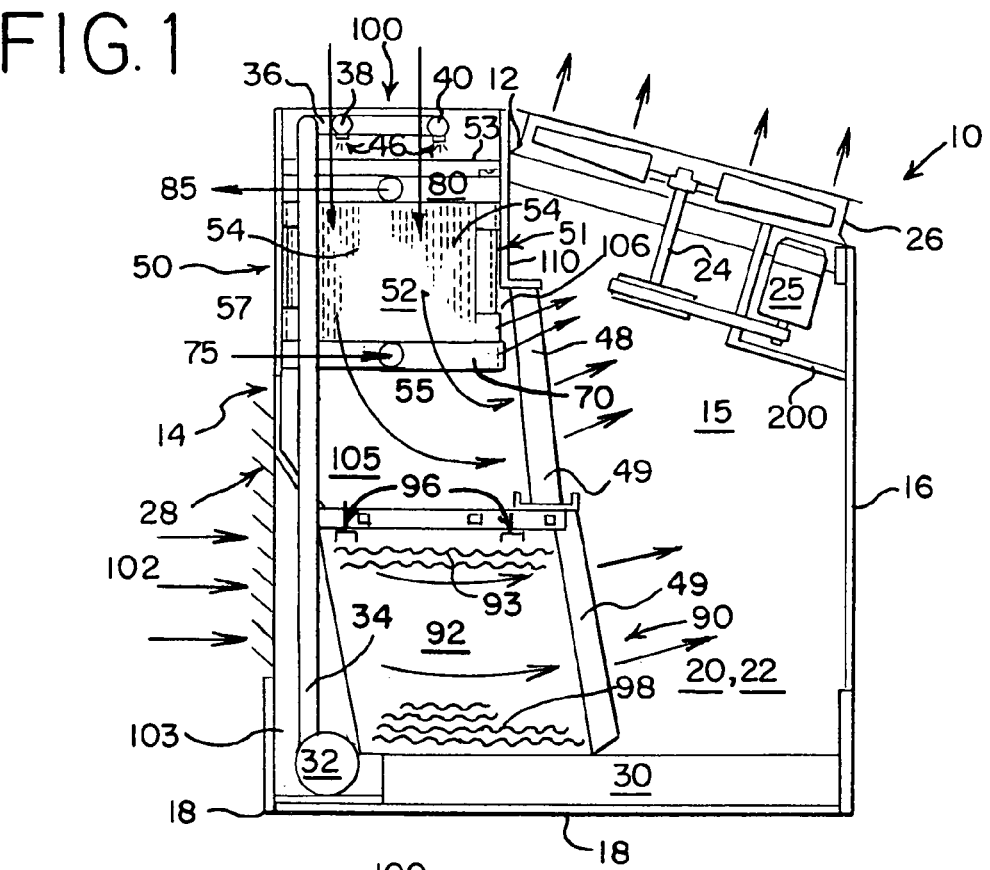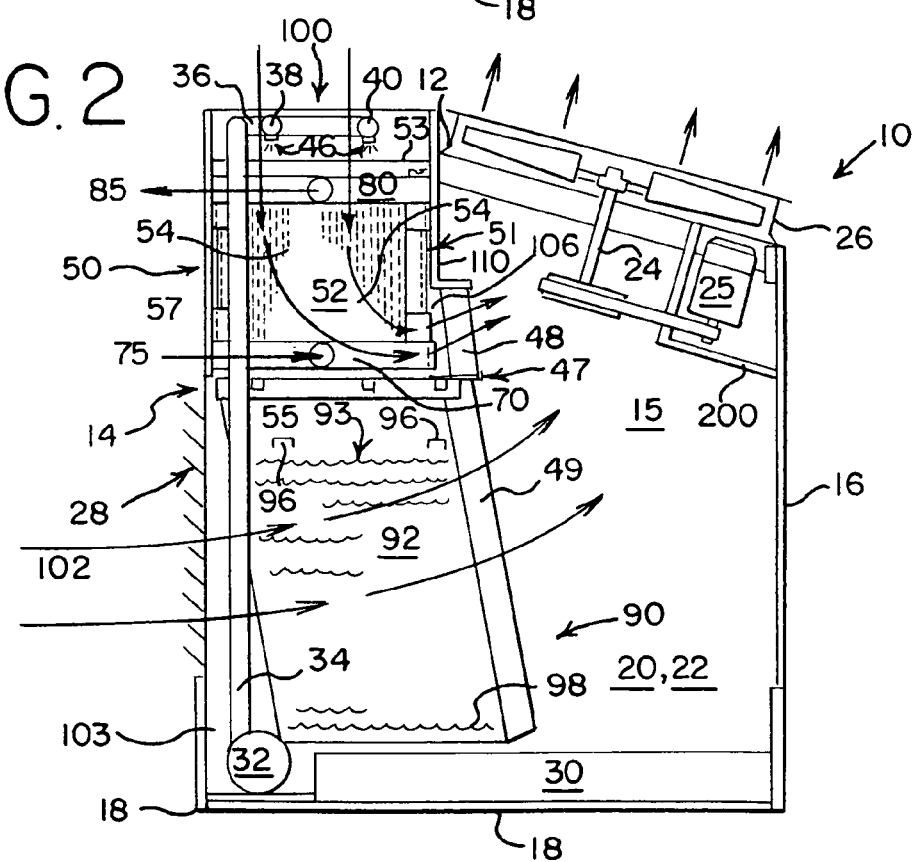

HEAT TRANSFER TUBE ASSEMBLY WITH SERPENTINE CIRCUITS

BACKGROUND OF THE INVENTION

This invention relates to an apparatus and method for an evaporative fluid cooler as a closed circuit cooling tower or as an evaporative condenser, in which an alternative coil circuiting arrangement is used to cool a the fluid or condense a gas in the closed loop.

The prior art includes the use of closed loop cooling towers for applications relating to industrial process cooling. Open circuit cooling towers have been used for large chilled water systems for many years. More recently, closed circuit cooling towers have been used for condenser water cooling systems for packaged chillers. Closed circuit cooling towers are also used on systems with many small, hard to clean heat exchangers, such as water source heat pumps and welding machines.

In a typical coil tube arrangement for a closed circuit cooling tower, circuits are provided between an upper header with a fluid inlet nozzle and a lower header with a fluid outlet nozzle. The individual circuits extend from the upper header to the lower header in a serpentine arrangement, which may be generally described as a series of parallel straight tube lengths connected by unshaped bends. Fluid has historically been communicated from the top of the coil tube assembly, or upper header, to the lower header by traversing the plurality of parallel tube lengths. However, in certain applications, the fluid flow through the coil tube assembly can be upwardly from a lower header to the upper header.

The fluid to be cooled is circulated inside the tubes of the bundle. Heat flows from the process fluid through the coil tube wall to the water cascading over the tubes from a spray-water distribution system. Air is forced upwardly or across or even downwardly over the coil depending on the specific configuration, evaporating a small percentage of the water, absorbing the latent heat of vaporization and discharging the heat to the atmosphere. The remaining water is recovered in a tower sump for recirculation to the water spray system. Liquid water droplets entrained in the air stream are recaptured in mist eliminators at the unit discharge and returned to the sump. Advances in evaporative coil product technology have led to higher thermal capacities per individual circuit unit. This higher flow capability has also resulted in an increase in tube bundle pressure drop with the traditional "double" serpentine bundles, where a grouping of two rows of circuits is fed from a common header. To solve the pressure drop dilemma, so-called "QUAD" serpentine bundles were developed, where groupings of four rows of circuits are fed from a common header, significantly lowering pressure drop, but simultaneously lowering thermal performance and increasing cost. In the designs for QUAD serpentine bundles, thermal performance is reduced due to the lower tube velocity, which results in a lower internal film heat transfer coefficient. In addition, fewer passes of the fluid to be cooled through the spray water chambers reduces the potential heat transfer. Performance is also negatively impacted as the heated spray water from one circuit falls onto a lower circuit below that is fed with the same temperature fluid. Cost is increased due to the greater number of circuits in a QUAD bundle (usually about twice that of double serpentine bundles), which must then be fabricated and welded into both the upper and lower headers, offset by the reduced length of individual circuits which make the individual circuits easier to bend. Additionally, multiple connections would often be required to accommodate the coil flow on the standard serpentine, leading to increased coil cost and installed cost for higher flow applications.

The prior art described above suffers various deficiencies in its application to closed circuit cooling towers. There is a need for a relatively simple and inexpensive coil circuiting arrangement for a closed circuit cooling tower that can maintain a relatively low pressure drop, but without simultaneously lowering thermal performance by a significant degree.

SUMMARY OF THE INVENTION

In accordance with the invention, there is provided a highly efficient heat transfer tube assembly with a triple circuited serpentine coil circuit assembly which overcomes the drawbacks of the prior art. The triple circuit assembly of the invention includes an upper inlet manifold through which the fluid to be cooled enters the triple circuit assembly. The heat transfer triple circuit assembly of the invention is mounted such that fluids to be cooled enter the triple circuit assembly at the top of the device. The fluids flow through one of three types of circuit paths to the bottom of the assembly where it exits through an lower outlet manifold. The serpentine triple circuit design feeds three types of circuit paths, causing the fluids to flow through various combinations of 90 degree bends, outside U-Bends, and nested U-Bends. The interweaving design of the circuits promotes a uniform flow of air and spray water throughout the triple circuit assembly matrix in a compact arrangement. Because of this interweaving design, the airflow meets essentially equal resistance throughout the triple circuit assembly. The triple circuit coil arrangement can be fed from either the top or bottom header, but most often is fed from the bottom header, as the design has the most benefit in units of combined coil/fill design, which incorporates an open evaporative heat exchange section with fill. Additionally, when used an evaporative condenser, the gas is almost always brought in the upper header because condensed liquid must drain downwardly within the coil.

The present invention provides numerous advantages over conventional cooling systems. The serpentine triple circuit design results in an efficient heat transfer, in which a low pressure drop and a high thermal performance are sustained for a better balance between heat transfer and pressure drop.

BRIEF DESCRIPTION OF THE DRAWINGS

FIG. 1 is a side elevational view of a combined flow closed circuit cooling tower in accordance with an embodiment of the present invention;

FIG. 2 is a side elevational view of a combined flow closed circuit cooling tower in accordance with another embodiment of the present invention;

DETAILED DESCRIPTION

Figure 3:
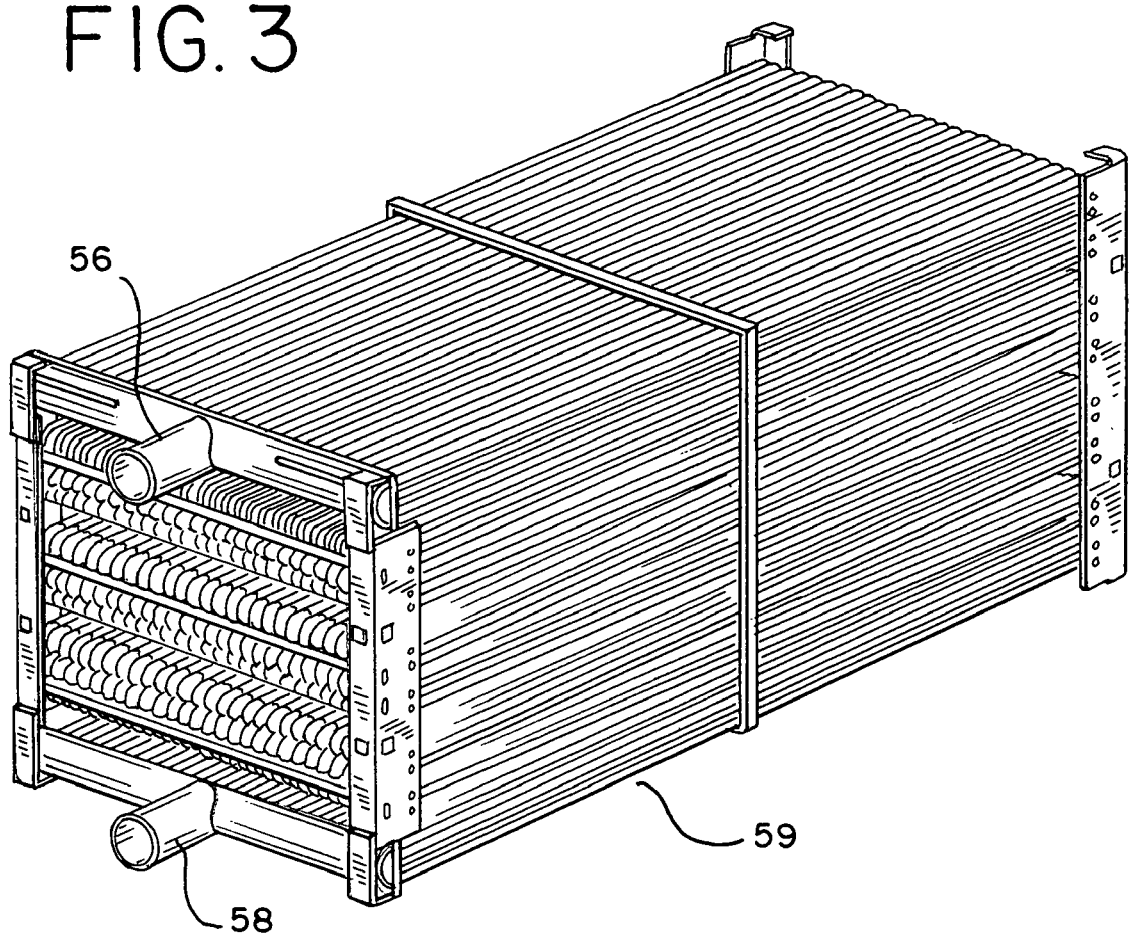
FIG. 3 is a perspective view of a triple circuit coil circuit assembly in accordance with an embodiment of the present invention.

The present invention provides reconfiguration of the coil assemblies in closed-circuit cooling towers illustrated in FIG. 1, and more particularly coil circuits for units operating at high internal fluid flows. In this context, fluids refer to gasses and liquids but are typically liquid. The physical environment and typical position of the coil assemblies are illustrated in FIG. 1. Closed-circuit cooling tower 10 of FIG. 1 is illustrative of a combined coil fill structure, but is an exemplary illustration and not a limitation to the present invention.

Referring now to FIG. 1 of the drawings, the heat exchange apparatus 10 in accordance with the invention is shown and is well known in the art as a closed-circuit cooling tower. Generally, apparatus 10 includes an enclosure structure which contains a multi-circuit indirect evaporative fluid cooling section 50, a direct evaporative heat exchange section 90, a lowermost evaporative liquid collection sump 30, and an uppermost distribution means 36 for spraying an evaporative liquid downwardly through apparatus 10, and a fan means 24 for moving a stream of air through each of the heat exchange sections 50 and 90, although natural draft is also a viable means for moving the air. Fan 24 can either be an induced or forced draft centrifugal fan or a common propeller type of fan, any of said fan choices requiring fan motor 25 to power them. Again referring to FIG. 1, motor 25 can be mounted within enclosure passageway 15 if an appropriate wet condition motor casing or a protective cover is used, or it can be mounted on the outside of the structure if desired. Here it is shown in the air stream in moisture proof box 200.

It is important to understand that apparatus 10 has many applications in the heat exchange field and that each application will use all of the same above-mentioned elements, although the operation of those elements might vary slightly from one type of application or the other. For example, apparatus 10 may be used to cool a single phase, sensible fluid such as water, which is flowing within an externally-supplied closed circuit system, or it may be used to desuperheat and condense a multi-phase sensible and latent fluid such as a refrigerant gas, also supplied from an external closed-circuit system.

As will become evident, the tower structure containing the above-mentioned components can also be arranged and formed in a number of different ways; apparatus 10 is not limited to strictly one shape or arrangement.

In accordance with one embodiment of the present invention illustrated in FIG. 1, the enclosure structure comprising apparatus 10 is shown with a generally rectangular shape which includes an upper roof surface 12, a base 18, a front wall 14, a rear wall 16, a first side wall 20 and a second side wall 22. The side walls 20, 22 and rear wall 16 are continuously solid panel members made from materials such as sheet metal, fiberglass, plastic, or the like, and these walls typically have corrosion resistant properties, as does front wall 14 and roof surface 12.

The rectangular enclosure structure of FIG. 1 contains an indirect heat exchange section 50, which is comprised of a single coil assembly 52, superposed above the direct evaporative heat exchange section 90. The indirect heat exchange section 50 is typically of a rectangular shape, having an inboard side 51, an outboard side 57, a top side 53 and a bottom side 55. The indirect heat exchange section coil assembly 52 receives a flowing hot fluid to be cooled from an offsite process and it is cooled in this section by a combination of indirect sensible heat exchange and a direct evaporative heat exchange. The evaporative liquid, which is usually cooling water, is sprayed downwardly by distribution means 36 onto the direct section, thereby exchanging indirect sensible heat with the fluid to be cooled, while the stream of ambient air entering primary air inlet 100, evaporatively cools the waters as the two mediums move downwardly through coil assembly 52. In this particular embodiment, the entering air stream is shown entering and flowing in a direction which is parallel or concurrent with the direction of cooling water, although the air flow stream is not limited to any particular flow pattern, as will become evident later on where a cross-current air flow pattern will be explained. Once the air and water cooling mediums reach bottom side 55 of indirect section 50, they split, with the air stream being pulled into plenum 105 and then into passageway 15 by fan 24, while the water gravitationally descends into direct heat exchange section 90. The air is then discharged from apparatus 10 through the fan cylinder 26, while the spray water is cooled in the direct heat exchange section as will be explained shortly. It is also important to note that the air stream entering inlet 100 supplies air that will only be used for cooling purposes in the indirect heat exchange section, regardless of the actual air flow pattern through said section.

The direct evaporative heat exchange section 90 functions to cool the water that is heated and descending from the indirect heat exchange section 50. Direct evaporative heat exchange section 90 is comprised of an array of tightly-spaced, parallel, plastic sheets 93 which form fill bundle 92, although fill bundle 92 could be formed by conventional splash-type fill. The hot water received by fill bundle 92 from indirect section 50 is distributed across each fill sheet 93 so that a source of outside ambient air which enters secondary air inlet 102, evaporatively cools the hot water descending the sheets. Here, the ambient air stream is shown entering direction 90 in a crosscurrent fashion to the descending hot water draining through the fill bundle 92, although other air flow schemes can be used, as will be seen later. The plastic fill sheets 93 are usually hung from beams 96 that are connected to and traverse sidewalls 20 and 22. Each sheet 93 has a generally continuous, waved pattern of grooves running the entire length of the sheet to aid in spreading the downflowing hot water into a thin film, thereby providing a larger exposed surface area for the air stream to interact with and provide evaporative cooling. Fill sheets 93 are preferably made from a polyvinyl chloride material, although other types of plastics could be used. As determined in FIG. 1, secondary ambient air inlet 102 provides ambient air that is strictly dedicated for evaporative cooling purposes in the direct heat exchange section only.

As further seen from FIG. 1, it is typical to cover the secondary air entryway 102 with a series of louvers 28 for proportioning the air flow into fill bundle 92. Typically, louvers 28 are motorized so that during cold weather, the louvers are completely closed and the cooling water system is shut off in order to operate cooling tower 10 as an all dry tower. The ambient air entering through louvers 28 initially flows across the secondary air plenum 103 before entering fill bundle 92 in a crosswise or crosscurrent fashion to the hot water downwardly gravitating through the plastic fill sheets 93. As mentioned, the stream of cold air passing over the film of hot water evaporatively removes heat from the water, thereby cooling the hot water by well known evaporative effects. The heated air exiting evaporative cooling section 90 then passes through secondary drift eliminator 49 before entering passageway 15, where it is forced by fan 24 to upwardly change directions for discharge to the atmosphere through fan cylinder 26. Since the air leaving the direct water evaporative cooling section 90 becomes saturated with moisture absorbed from cooling water, the secondary drift eliminator 49 is interposed between the fill bundle 92 and passageway 15 to facilitate in removing the water droplets entrapped in the air stream. Drift eliminator 49 is typically comprised of closely spaced metal, plastic or wood slats or louvers which permit air flow therethrough, but will collect the fine water droplets in the air. The collected water then gravitates down eliminator 49, directly into underlying collection sump 30 for recirculation.

Base 18 of apparatus 10 is substantially comprised of a water collection sump 30 which is typically disposed only below direct evaporative heat exchange section 90, although it truly depends upon how the components are arranged within the structure of apparatus 10. The heated cooling water descending from direct evaporative heat exchange section 90 is allowed to mix in sump 30 so that it can attain a generally uniform temperature before being pumped for use again in the indirect heat exchange section 50. As seen, vertically extending recycle piping 34 operably connects cooling water distribution means 36 with pump 32 and sump 30. Pump 32 is arranged outside of sump 30, near the corner of front wall 14 so that it can be easily serviced.

Distribution means 36 is generally located above the single coil assembly 52 of indirect evaporative cooling section 50, which is also in positional relationship with primary ambient air inlet 100. Distribution means 36 consists of identical cooling water distribution legs 38 and 40, each of which laterally transverses the width of tower 10 in a spaced, parallel relationship from each other and from front wall 14. Each distribution leg 38 and 40 is constructed from pipe and has a series of spray nozzles 46 attached along the bottom of the pipe for evenly distributing the cooling water across the top side 53 of indirect evaporative heat exchange section 50 and generally across primary air inlet 100. Depending upon the heat exchange capacity required from apparatus 10, the number of water distribution legs can vary from 1 to 5 legs or more per indirect evaporative coil section 52, with the length of each leg varying to match the length of indirect evaporative cooling section 50 Typically, the number of nozzles 46 per coil assembly 52 of indirect section 50 will also vary depending upon the tower capacity, and may range between 9 and 180 nozzles for these size units. Likewise, pump 32 is sized according to tower capacity such that the continuous supply of cooling water pumped to spray nozzles 46 will produce a fine spray of water across the entire span of the primary air inlet 100 and hence, across the single coil assembly 52. Similarly, an upper drift eliminator 48 is interposed between side outlet opening 106, plenum 105 and passageway 15 to remove the water droplets entrapped by the primary air stream while evaporatively cooling the water descending through indirect heat exchange section 50. Pan 47 is disposed below upper drift eliminator 48 for collecting the water from mist eliminator 48 and gravitationally dispensing it upon fill sheet bundle 92. It is to be understood that the opening which defines primary ambient air inlet 100 has dimensional length and width equal to that of the direct evaporative cooling section 50 no matter where the entry is located. From FIG. 1, it is seen that the entering air stream initially approaches entryway 100 generally perpendicular to the top side 53 of indirect heat exchange section 50, substantially concurrent with the water sprayed downwardly from distribution means 36.

The continuous operation of the apparatus shown in FIG. 1 as a single phase fluid cooler proceeds as follows. Hot fluid to be cooled is supplied to header 70 at the bottom side 55 of single coil heat exchange assembly 52 by supply conduit 75. The hot fluid evenly distributes itself within header 70 and into each of the attached, staggered groups of individual circuits 54, so that fluid flows upwardly at a substantially uniform flow rate within the entire series of circuits comprising single coil assembly 52. As the fluid moves upward, it effectively moves as a continuous plane or sheet of fluid until all of the tubing runs 54 on each of the top rows of top side 53 of indirect heat exchange section 50 are generally equally exposed to simultaneous contact with the primary ambient air stream air inlet 100 and to the uniform temperature of cooling water downwardly sprayed from sprays 46 of distribution means 36. Fan 24 induces the cold ambient air stream into primary air inlet 100 at an angle substantially perpendicular to the entire series of circuits comprising the top side 53 of indirect section 50. Likewise, the coldest available cooling water from direct evaporative section 90, is ejected downwardly from sprays 46 generally into air inlet 100 and generally across top side 53 of indirect heat exchange section 50. As previously mentioned, when the cooling water descends from bottom fill member 98, its temperature varies along the longitudinal extent or depth of direct section 90, and only because the water is collected and allowed to mix within sump 30, does it have a uniform temperature when later pumped to means 36. The cooled fluid leaves through upper header 80 and outlet nozzle 85.

In this particular embodiment, the primary air and cooling water streams concurrently flow together and simultaneously impinge upon all rows of all circuit groups 54, which comprise the series of circuits in indirect coil assembly 52. More particularly, since the entire series of circuits initially experience uniform temperature water and air streams flowing downwardly in the same direction, and since the temperature of the fluid within the circuits is substantially constant across the series of circuits at any given horizontal or vertical point within the coil assembly, the air and water flow streams absorb heat uniformly as they progress downwardly through coil assembly 52; necessarily meaning that the circuits substantially undergo an equal rate and quantity of heat exchange from circuit to circuit also. By this, it is not meant that the air and water streams are absorbing equal amounts of heat, for it is known that the water will absorb substantially greater amounts of heat than the air, thereby having a substantially greater role in affecting the uniformity of performance. Rather, it is meant that each of the cooling mediums will independently absorb heat at a constant rate from circuit to circuit at any horizontal or vertical point within the indirect heat exchange section 50. The uniformity of performance throughout the vertical and horizontal directions of the indirect heat exchange section 50 is important when trying to maximize the heat exchange in this section. However, it is important to understand that the uniform temperature water plays the major role in creating this minimization since a substantially greater majority of heat exchange occurring in indirect section 50 is through indirect sensible heat exchange between the cooling water and the fluid to be cooled. This means that the air flow pattern through the indirect section 50 has a much lesser effect on uniformity, no matter what air flow pattern is chosen.

Returning to FIG. 1, it should also be understood that the entire top series of circuits operationally contain the coldest fluid to be cooled when the fluid reaches top side 53 for contact with the entering air and water. The coldest available cooling water contacts the series of circuits causing the temperature of the fluid within the circuits to nearly approach that of the cooling water. As mentioned, the cold, uniform temperature water impinging upon the tubing circuits is in indirect sensible heat exchange with the internally flowing fluid to be cooled, while the concurrently flowing air stream evaporatively cools the now-heated cooling water as both mediums continue their downward travel through the indirect heat exchange section 50. In order to fully promote the evaporative heat exchange between the air stream and the evaporative liquid, the air stream completely travels through indirect section 50, then enters plenum space 105 before being discharged.

Turning now to FIG. 2, it is seen that all of the air flow entering primary air inlet 100 still enters indirect section 50 in a substantially concurrent direction to the downwardly sprayed cooling water, but now apparatus 10 is provided with an opening 106 in partition wall 110 on the inboard side of indirect heat exchange section 50 to let part of the air out. In this way, after the air stream has substantially passed through the vertical extent of coil assembly 52 and approaches bottom side 55 of indirect section 50, part of it subtly changes direction by approximately 90 degrees and is converted into a crosscurrent flow stream at that point. Fan 24 then pulls both portions of the air stream through opening 106 and upper drift eliminator 48 so that entrapped moisture is removed from the air before it passes into passageway 15 for discharge through fan cylinder 26. Because most of the heat exchange taking place within indirect section 50 is through indirect sensible heat exchange between the uniform temperature cooling water and the internally flowing fluid, this particular air flow scheme has been found to have reduced the cost to capacity ratio of the apparatus 10.

When the triple circuit coil assembly of FIG. 1 is used as an evaporative condenser, it performs substantially the same way as when apparatus 10 is used as a fluid cooler, except that instead of a cooled fluid leaving top header 80 through pipe 85, pipe 85 is used for supplying a superheated vapor, such as a hot refrigerant gas, to the indirect heat exchange section 50 for cooling, thereby condensing the hot refrigerant gas back to a liquid state. The gas enters header 80, where an internally mounted baffle plate 99 ensures uniform distribution to all of the individual conduit groups 54, connected to header 80. If baffle plate 99 were not used, the gas stream would concentrate around the entrance of pipe line 85, thereby decreasing the performance of indirect condensing section 50 through uneven circuit to circuit performance. As before, the coldest available air entering primary air inlet 100 and the coldest uniform temperature water sprayed downwardly from spray distribution nozzles 46, contacts the hottest available gas stream entering conduit groups 54, thereby providing the most efficient and effective use of each cooling medium for condensing the gas. As explained earlier with the fluid cooler operations, the evaporative water that is descending and being heated through vapor condensing section 50, is partially cooled in the indirect section through evaporative heat exchange with the entering air, and is further cooled by direct evaporative heat exchange with the air flowing within the direct evaporative heat exchange section 90. The cooled evaporative liquid is then gathered in sump 30 for redistribution by pump 32 to distribution means 36 for recirculation in the indirect heat exchange section 50. The heated air streams traveling through each of the heat exchange sections enter passageway 15, and then are discharged by fan 24 to the atmosphere. It is very important to provide uniform circuit to circuit performance when operating apparatus 10 as an evaporative condenser and the uniformity of performance is ensured by maintaining an even flow distribution and retention time of the gas within each circuit, as well as maintaining a uniform temperature for the cooled water, and to a lesser extent, a uniform temperature air stream. Uniformly is more critical in an evaporative condenser or else the coil assembly 52 will experience uneven condensing performance. For example, if the circuits closest to the outboard side 57 of the indirect heat exchange section are exposed to a colder evaporative liquid than the circuits on the inboard side 51, then the outboard circuits are capable of condensing greater amounts of vapor. The increased capacity in the outboard circuits causes an increase in pressure drop through these circuits. Since the inlets and outlets of each circuit are connected to common headers, the overall pressure drop across all circuits must be identical. Therefore, liquid must back up into the outboard circuits in order to create a balancing liquid head to compensate for the extra frictional pressure drop in these circuits. When liquid backs up, it causes a decrease in performance due to the reduction of coil surface available for condensing. Therefore, this form of operation which is common with prior art condensers, is undesirable because it causes less than 100 percent utilization of the available condensing surface and decreases the rated output of the apparatus. After the desuperheated gas is condensed into a liquid, it is collected in lower header 70 and then discharged via piping 75 for use in the offsite process again.

One skilled in the art should appreciate even further that the invention is not so necessarily limited to only fluid cooler or evaporative condenser devices and that this invention could even be used as a wet air cooler in any one of the embodiments already shown and described.

Again, since each component of apparatus 10, when used as wet air cooler, is exactly the same as when used as a fluid cooler or an evaporative condenser, the nomenclature and reference characters used in describing the previous devices will be exactly the same for a wet air cooler. Turning attention to FIG. 2, the operation of this embodiment when used as a wet air cooler will now be described operationally, the air flow streams entering the primary and secondary air inlets, 100 and 102 respectively, will be the same as previously described; concurrent in the indirect section and crosscurrent in the direct section. However, the object of apparatus 10 now is to cool the warm air streams entering the direct and indirect heat exchange sections. Instead of containing a hot fluid to be cooled, each of the series of circuit groups 54, of coil assembly 52 now contain an initially chilled fluid which is supplied from an off-site process. In lieu of a chilled fluid the circuits could also contain an evaporating multi phase refrigerant. The chilled fluid enters from the bottom side 55 of indirect section 50 as before, entering supply header 70 and flowing upwardly as a continuous plane of generally uniform increasing temperature fluid. As the evaporative liquid flows down over the coil assembly 52 heat is simultaneously added from the concurrently flowing initially warm air stream and removed to the counter flowing chilled fluid stream within circuit groups 54. More heat is removed than added to the evaporative liquid therefore its temperature is decreased as it flows downwardly through the indirect heat exchange section. The warm air stream entering primary air inlet 100 directly contacts and is cooled by the evaporative liquid. Likewise, the chilled fluid within circuit groups 54 absorbs heat from the evaporative liquid, causing the fluid to become heated as it reaches the top side 53 of indirect section 50. The heated fluid enters top header 80 before returning to the off-site process through returning to the off-site process through return piping 85, while the primary air stream exits the indirect section 50 through side opening 106. The now cooled evaporative liquid is then distributed across the direct heat exchange section 92 where it directly contacts and exchanges heat with an initially warm cross flowing secondary air stream passing there through. The temperature of the evaporative liquid increases as it passes downwardly through the direct section and is collected in a sump and then pumped back for redistribution over the indirect heat exchange section. This now cooled secondary air stream mixes with the cooled primary air stream in plenum 15, where the combined air stream is discharged through fan cylinder 26 for use at a separate off-site location, such as for a gas turbine air inlet pre-cooling operation.

Figure 4:
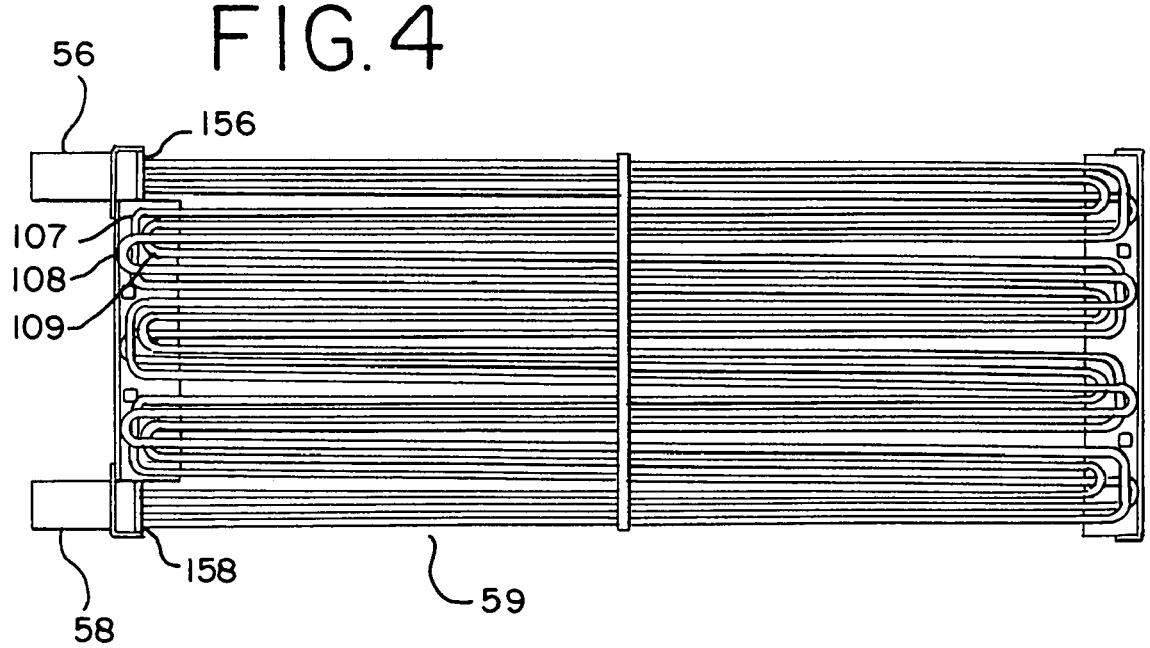
FIG. 4 is a side view of a triple circuit coil circuit assembly in accordance with an embodiment of the present invention.

FIG. 3 provides a perspective view of the triple circuit assembly 52 in FIG. 2. In the triple circuit assembly 59 of the present invention as shown in FIGS. 3 and 4, fluids are fed through three types of circuit paths, instead of two types of circuit paths in the double serpentine circuit design, and four types of circuit paths in the QUAD serpentine design. Moreover, with the triple circuit serpentine circuit design, there are three rows of circuits per pass versus two rows of circuits per pass in the standard double serpentine circuit design, and versus the four rows of circuits per pass in the QUAD serpentine circuit design. As shown in FIG. 4, with the current triple circuit assembly, fluids enter the triple circuit assembly 59 through an upper inlet pipe 56 and manifold 156 and flow into one of three types of circuit paths to the bottom of the triple circuit assembly, where it exits through a lower outlet manifold 158 and outlet pipe 58. Fluids entering the triple circuit assembly 59 flow through one of three types of circuit paths, with each circuit path involving three possible circuit types: a first circuit 109, a second circuit 108, and a third circuit 107. As shown in FIG. 4, fluids running through the second circuit path 108 would flow in the following order: lower inlet manifold 158, initial pass, 90 degree Circuit, Outside U-Bend Circuit, Outside U-Bend Circuit, 90 degree or straight section Circuit, Outside U-Bend Circuit, Outside U-Bend Circuit, 90 Degree Circuit, final pass, and upper outlet manifold 156. Fluids running through the first circuit path 109 would flow in the following order: lower inlet manifold 158, Outside U-Bend Circuit, 90 degree Circuit, Nested e U-Bend Circuit, Outside U-Bend Circuit, 90 degree Circuit, Nested U-Bend Circuit, Outside U-Bend Circuit final pass, and upper outlet manifold 156. Fluids running through the third circuit path, 107 would flow in the following order: lower inlet manifold 158, initial pass, Nested U-Bend Circuit, Nested U-Bend Circuit, 90 degree Circuit, Nested U-Bend Circuit, Nested U-Bend Circuit, 90 degree Circuit, Nested U-Bend Circuit, final pass, and upper outlet manifold 156. In total, fluids flowing through each of the three types of circuit paths would undergo a total of eight passes in the triple circuit assembly shown. Note that other triple circuit arrangements are possible with varying numbers of passes.

The triple circuit assembly design offers many advantages over standard double-circuited design and QUAD-circuited design. The circuits are spaced in a matrix such that alternating horizontal rows crisscross the longitudinal axis of the triple circuit assembly. This allows three serpentine circuits to reside in the space normally occupied by two circuits. The interweaving of the circuits promotes a uniform flow of air and spray water throughout the triple circuit assembly matrix. Because of this interweaving, the airflow sees essentially equal resistance throughout the tube bundle. These effects promote improved thermal performance due to more uniform heating of the spray water and airflow, along with thorough wetting of the triple circuit assembly, which minimize the potential for scale and fouling. Additionally, the larger header of the triple circuit design allows the use of a larger, single connection or fewer multiple larger connections to accommodate the coil flow, reducing factory cost and installed cost for the customer.

For a given size tube bundle, the heat transfer surface area is essentially identical between the three coil designs: double-circuited design, triple circuited design, and the QUAD-circuited serpentine design. However, the triple circuited design significantly lowers pressure drop compared to the double serpentine design, with a smaller performance derate than the QUAD bundle design. Based on a thermal model and actual testing comparing the three coil designs (standard double-circuited design, triple tri-circuited design, and QUAD-circuited design), for a specific coil size, the relative pressure drop of the proposed triple circuited design was found to be approximately 0.35 times that of the standard double-circuited design, compared to the QUAD-circuited design which was found to be approximately 0.13 times that of the standard double-circuited design. Based on the aforementioned thermal model and actual testing comparing the three coil designs, the relative thermal performance of the proposed triple design was found to be approximately 0.96 times that of the standard double-circuited design, compared to the QUAD-circuited design which was found to be approximately 0.92 times that of the standard double-circuited design at typical rating conditions. It should be noted that many modelings, designs, and experiments were conducted to create a design that would allow for these three circuits to intertwine with each other in an optimum, unique, non-obvious, yet practical and economical arrangement.

Figure 5:
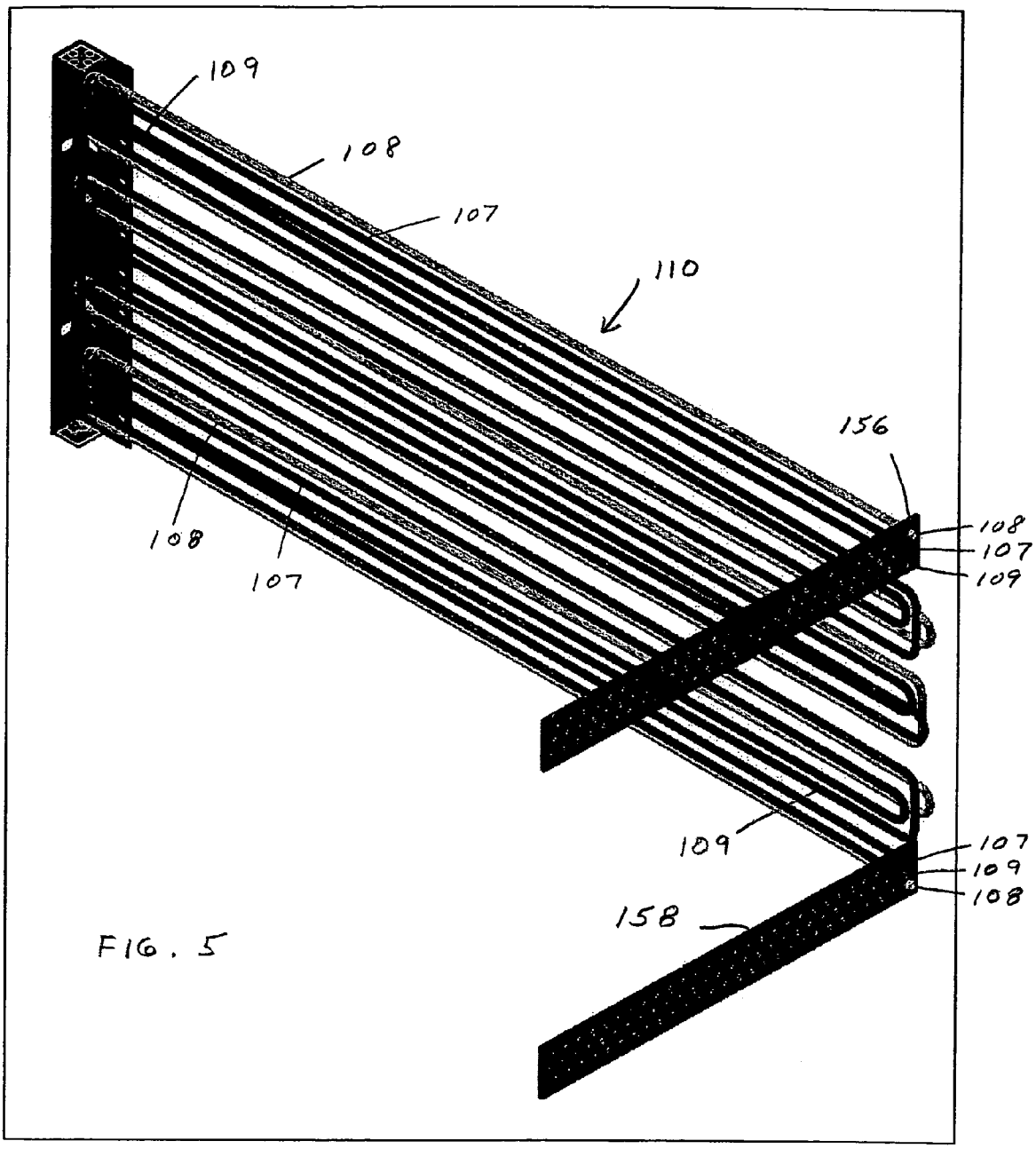
FIG. 5 is a detailed view of a triple circuit coil in accordance with the present invention.

Referring now to FIG. 5, a detailed view of a triple circuit conduit group is shown, with the other conduit groups removed for clarity. Inlet manifold 156 is connected to one end of a circuit path 110 of continuous tubes. Each circuit path 110 is comprised of three separate continuous tubes. A first of the continuous tubes is shown at 109, with the first of the continuous tubes having an outside U bend at the bent portion of the continuous tube that forms a first main length section that extends away from in a flow direction inlet header 156 plate and a second main length section that extends toward in a flow direction outlet header plate 158. In a plane structure, tube 109 is in a nearest plane.

A second of the continuous tubes is shown at 108, with the second of the continuous tubes having a straight length bend at the bent portion of the continuous tube that joins a first main length section that extends away from inlet header plate 156 in the direction of flow and a second main length section that extends toward outlet header plate 158 in the direction of flow. In a plane structure, tube 108 is in a furthest plane.

A third of the continuous tubes is shown at 107, with the third of the continuous tubes having a nested U bend at the bent junction of the continuous tube that joins a first main length section that extends away from in a flow direction inlet header plate 156 and a second main length section that extends toward in a flow direction outlet header plate 158. In a plane structure, tube 107 is in a plane that crisscrosses both the nearest plane of tube 109 and the furthest plane of tube 108.

It should be understood that each of first continuous tube 109, second continuous tube 108 and third continuous tube 107 is comprised of a plurality of bends and main length sections. The number of such bends and main length section varies with the desired capacity of the triple circuit assembly, but can be vary from 2 bends and 2 main length sections to 20 or more bends and main length sections.

In reviewing the configuration of each circuit path 110, as explained above, there are design criteria that balance optimal heat exchanger performance with cost. It is found that in a preferred embodiment of the present invention, the first continuous tube 109 in each circuit path is to be located at a laterally inner position. The second continuous tube 108 is to be located at a laterally outer planar position.

The third continuous tube 107 is positioned laterally between first continuous tube 109 and second continuous tube 108. It is not critical that such positioning of the third continuous tube 107 be exactly laterally between the first continuous tube 109 and the second continuous tube 108, but such nesting of the third continuous tube 107 can be chosen to optimize heat exchange.

The above-described improved heat transfer tube bundle with serpentine triple circuits and methods for using these circuits within a cooling tower are embodiments of the implementation and method of the present invention. The implementation and method illustrate one possible approach for improving heat transfer in a closed circuit cooling tower through a circuiting arrangement that can maintain a relatively low pressure drop, but without simultaneously lowering thermal performance to a significant extent. However, it is possible that a coil arrangement in accordance with the present invention could be utilized in alternate applications such as evaporators. The actual implementation may vary from the configuration discussed. Moreover, various other improvements and modifications to this invention may occur to those skilled in the art, and those improvements and modifications will fall within the scope of this invention as set forth in the claims below.

The invention claimed is:

1. A triple circuit assembly for use in a heat exchanger, the triple circuit assembly comprising
   a first manifold for inletting fluids to the triple circuit assembly,
   a second manifold for outletting fluids from the triple circuit assembly,
   the triple circuit assembly comprising a plurality of circuit paths, each circuit path comprising three separate continuous tubes, and each circuit path comprising a main length section and a bend section,
   wherein the first of the continuous tubes located at a laterally and vertically extending inner plane in each circuit path, the second of the continuous tubes located at a laterally and vertically extending outer plane in each circuit path opposite from the laterally and vertically extending plane of the first of the continuous tubes, and the third of the continuous tubes positioned laterally between the first of the continuous tubes and the second of the continuous tubes, and
   the third of the continuous tubes includes a main length section that crosses from the laterally and vertically extending inner plane of the first of the continuous tubes to the laterally and vertically extending outer plane of the second of the continuous tubes and wherein each circuit path bend section is vertically aligned.

2. A triple circuit assembly for use in a heat exchanger, the triple circuit assembly comprising:
   a first manifold for inletting fluids to the triple circuit assembly,
   a second manifold for outletting fluids from the triple circuit assembly,
   the triple circuit assembly comprising a plurality of circuit paths, each circuit path comprising three separate continuous tubes each tube having a main length section and a return bend section,
   wherein the first of the continuous tubes is located at a laterally and vertically extending inner plane in each circuit path, the second of the continuous tubes located at a laterally and vertically extending outer plane in each circuit path opposite from the laterally and vertically extending plane of the first of the continuous tubes and the third of the continuous tubes is located generally in each of and between the inner and the outer planes in that at least one main length section of the third of the continuous tubes crosses from the inner plane to the outer plane, and
   wherein the third of the continuous tubes includes return bend sections, each return bend section extending vertically and being located entirely within the inner plane or the outer plane.

* * * * *